US010425158B2

(12) United States Patent
Oh et al.

(10) Patent No.: US 10,425,158 B2
(45) Date of Patent: Sep. 24, 2019

(54) APPARATUS FOR CONTROLLING LINE GUIDE OF AUTOMATED MATERIAL HANDLING SYSTEM AND METHOD THEREOF

(71) Applicant: Hak Seo Oh, Gyeonggi-do (KR)

(72) Inventors: Hak Seo Oh, Gyeonggi-do (KR); Hyo Suk Park, Gyeonggi-do (KR); Jin Hwan Ko, Seoul (KR); Sung Hyuk Youn, Incheon (KR); Youl Kwon Sung, Gyeonggi-do (KR)

(73) Assignee: Hak Seo Oh, Gyeonggi-Do (KR)

( * ) Notice: Subject to any disclaimer, the term of this patent is extended or adjusted under 35 U.S.C. 154(b) by 35 days.

(21) Appl. No.: 15/819,143

(22) Filed: Nov. 21, 2017

(65) Prior Publication Data

US 2019/0158178 A1    May 23, 2019

(51) Int. Cl.
*B61B 3/02* (2006.01)
*H04B 10/116* (2013.01)
*G02B 6/44* (2006.01)
*G05B 19/4061* (2006.01)

(52) U.S. Cl.
CPC .............. *H04B 10/116* (2013.01); *B61B 3/02* (2013.01); *G02B 6/4422* (2013.01); *G05B 19/4061* (2013.01)

(58) Field of Classification Search
CPC ....... B61B 3/02; H04B 10/116; G02B 6/4422; G05B 19/4061
USPC .............. 700/228, 229, 255; 701/19, 20, 96; 198/357
See application file for complete search history.

(56) References Cited

U.S. PATENT DOCUMENTS

| 5,023,790 | A | * | 6/1991 | Luke, Jr. | .......... | G05B 19/41865 180/168 |
| 5,267,173 | A | * | 11/1993 | Tanizawa | ............. | G05D 1/0261 104/88.03 |
| 5,283,739 | A | * | 2/1994 | Summerville | ....... | G05D 1/0289 180/168 |
| 5,329,449 | A | * | 7/1994 | Tanizawa | ............. | G05D 1/0261 180/168 |
| 5,845,725 | A | * | 12/1998 | Kawada | ............... | G05D 1/0265 180/167 |

(Continued)

OTHER PUBLICATIONS

US 2014/0164126 A1, Nicholas et al., Jun. 12 (Year: 2014).*
US 2015/0277440 A1, Kimichi et al., Oct. 1 (Year: 2015).*
US 2018/0053141 A1, Shydo, Jr., Feb. 22 (Year: 2018).*

*Primary Examiner* — Douglas A Hess
(74) *Attorney, Agent, or Firm* — IPLA P.A.; James E. Bame

(57) ABSTRACT

An apparatus for controlling line guide of an automated material handling system, comprises: optical lines in which a side light emission optical fiber is installed in the whole section of a confluence of a plurality of lines of lines for moving the unmanned transport devices; a main confluence control device which is installed at the confluence, performs optical communication with the unmanned transport device through the optical line; and a sub-confluence control device which is installed in the unmanned transport device, performs optical communication with the main confluence control device through the optical line to report an entry state or a pass completion state for the confluence, and controls the unmanned transport device to perform an entry operation or a standby operation depending on the pass control signal.

17 Claims, 15 Drawing Sheets

(56) References Cited

U.S. PATENT DOCUMENTS

| | | | |
|---|---|---|---|
| 6,290,188 B1* | 9/2001 | Bassett | B61L 23/34 246/1 C |
| 6,908,066 B2* | 6/2005 | Koenig | A63H 18/16 246/122 A |
| 7,477,963 B2* | 1/2009 | Hori | B65G 1/0421 198/358 |
| 8,346,468 B2* | 1/2013 | Emanuel | G05D 1/0289 340/901 |
| 8,825,226 B1* | 9/2014 | Worley, III | A63J 1/00 701/2 |
| 9,230,236 B2* | 1/2016 | Villamar | G06Q 10/087 |

* cited by examiner

APPARATUS FOR CONTROLLING LINE GUIDE OF AUTOMATED MATERIAL HANDLING SYSTEM AND METHOD THEREOF

BACKGROUND

The present invention relates to an apparatus for controlling line guide of automated material handling system and a method thereof, and more specifically, to an apparatus for controlling line guide of automated material handling system and the method thereof, in which an optical line is installed at a confluence of a plurality of lines, and when a plurality of unmanned transport vehicles simultaneously enter the confluence, the unmanned transport vehicles are allowed to pass sequentially depending on predetermined priority to prevent the unmanned transport vehicles from colliding with each other at the confluence.

Generally, in manufacturing processes of a liquid crystal display device and a semiconductor element, the manufacturing goods are transferred to the manufacturing stations of each manufacturing process by using an automated material handling system (AMHS), so that the corresponding goods are manufactured according to the manufacturing processes of each manufacturing station. Such an automated material handling system utilizes an unmanned automatic transfer device for transferring a carrier of receiving a semiconductor substrate or a liquid crystal substrate to the manufacturing station located on the manufacturing process line and transferring the carrier of again receiving the goods completely processed in the corresponding manufacturing station to the next manufacturing station.

Depending on the movement method thereof, the unmanned automatic transfer device includes an automated guided vehicle (AGV) for driving through the wheel, a rail guided vehicle (RGV) for driving along the guide rail located at the bottom, and an overhead hoist transport (OHT) for driving a guide rail installed in the ceiling. These unmanned automatic transfer devices are moved to the corresponding manufacturing equipment by using the wheel itself or along the bottom rail or the overhead rail and it carries the carrier onto or carries the carrier out the manufacturing equipment by using an operating arm or a hoist and a hand.

At this time, the unmanned automatic transfer devices having different paths should pass through the confluence of the plurality of rails without colliding with each other.

In the conventional art, optical communication devices are installed on the approach and the unmanned automatic transfer device and a receiving device is installed on the exit, so that it determines whether the unmanned automatic transfer devices enter the confluence or not by means of the optical communication between the unmanned automatic transfer device and the central control equipment so as to avoid collision.

However, in case of the configuration for avoiding the collision at the confluence, since it enables communication in only one area, where the unmanned automatic transfer device stops at the middle of the confluence owing to equipment failure, it can be collided with the next unmanned automatic transfer device. Also, there are problems in that the unmanned automatic transfer device should be always moved near the communication center of the approach at low speed and only one unmanned automatic transfer device can enter one lane.

In addition, in the conventional art, in order to prevent the collision between the unmanned automatic transfer devices, the communication repeater is installed on the path of the confluence of the rails, along which the unmanned automatic transfer devices are driven. Also, in order to manage the run of the plurality of the unmanned automatic transfer devices at the confluence, a management means for generating operation signal information through wireless communications between the communication repeater and the communication device of the unmanned automatic transfer device is installed thereon.

However, in case of the configuration for preventing the collision between the unmanned automatic transfer devices at the confluence, since the antennas for enabling the wireless communications should be installed every the paths of the confluence, it is difficult to install the antennas every the paths thereof. Also, at the curve areas of the rails, it is difficult to manufacture and install the antennas appropriate for the corresponding curve area.

SUMMARY OF THE INVENTION

The invention has been made in consideration of the circumstances described above, and a technical object of the present invention is to provide an apparatus for controlling line guide of automated material handling system and the method thereof, in which an optical line having a side light emission optical fiber is installed in a line of a confluence, and when a plurality of unmanned transport vehicles simultaneously enter the confluence, a pass control signal for a passable state/impassable state of each unmanned transport device is provided depending on predetermined priority to prevent the unmanned transport vehicles from colliding with each other at the confluence.

According to an aspect of the invention to achieve the object described above, there is provided an apparatus for controlling line guide of an automated material handling system to prevent unmanned transport devices which transport carriers among manufacturing facilities from colliding with each other, including: a plurality of optical lines in which a side light emission optical fiber is installed in the whole section of a confluence of a plurality of lines of lines for moving the unmanned transport devices, and which performs optical communication with the unmanned transport devices through one side of the optical fiber, wherein one end of the optical fiber is connected to a main confluence control device, thereby performing optical communication between an unmanned transport device moving on a line and the main confluence control device in the whole section of the line on which the optical fiber is installed; a main confluence control device which is installed at the confluence, performs optical communication with the unmanned transport device through the optical line to confirm an entry state or a pass completion state of the unmanned transport device for the confluence, and outputs a pass control signal for a passable or an impassable state depending on predetermined priority when a plurality of unmanned transport device enter the confluence; and a sub-confluence control device which is installed in the unmanned transport device, performs optical communication with the main confluence control device through the optical line to report an entry state or a pass completion state for the confluence, and controls the unmanned transport device to perform an entry operation or a standby operation depending on the pass control signal.

Preferably, the main confluence control device includes a wireless communication unit which wirelessly outputs a pass control signal for a passable state or an impassable state depending on predetermined priority to each unmanned transport device when a plurality of unmanned transport devices enter the confluence, in a state where the optical communication is disconnected in a communication break section of the optical line, and wherein the sub-confluence control device includes a wireless communication unit which performs wireless communication with the main confluence control device to report an entry state or a pass completion state for the confluence, controls the unmanned transport device to perform an entry operation or a standby operation depending on the pass control signal, collects state information of the main confluence control device, and then reports the collected state information to a higher-level system.

Preferably, the wireless communication unit of the main confluence control device transmits a unique ID thereof to the wireless communication unit of the sub-confluence control device at the beginning of entry of the optical line, to set a wireless communication link.

Preferably, the optical line includes: the side light emission optical fiber; a reflection cover which is provided with an inner accommodation space in a shape corresponding to an outer surface of the optical fiber and fixes the optical fiber so as not to deviate from the optical line; a transparent body which is installed on the opposite side of the reflection cover and allows light input or output from the optical fiber to penetrate to one side thereof; an optical coupler which is installed at one end of one side of the optical fiber and is connected to the main confluence control device to perform optical communication with the sub-confluence control device; and a reflector which is installed at an end of the other side of the optical fiber so as to reflect light.

Preferably, the reflection cover is formed in a side reflective mirror structure.

Preferably, the optical coupler includes: a fixing means which prevents a deviation of the optical fiber so as to fixes the optical fiber; a guide means which guides a side reflection path of the optical fiber and an insertion path of the optical fiber; a stopper which restricts an insertion depth of the optical fiber in a predetermined length; an integrated board which includes a light emission unit and a light reception unit for performing optical communication with the optical fiber, a driving circuit for providing a driving pulse for driving the light emission unit, and an amplification unit for amplifying and outputting an optical signal passing through the light reception unit; and a side reflector which is installed at a front end of the integrated board and increases optical efficiency of the light emission unit and the light reception unit.

Preferably, an inside of the stopper is processed to be a reflector.

Preferably, the main confluence control device includes: a power supply unit which supplies a driving power; a LED driving unit which outputs a driving pulse signal for driving the optical coupler; a reception demodulation unit which demodulates an analog signal received from the optical coupler into a digital signal; a state display unit which displays state information including a power state, a communication state, an error state, and a port connection state; and a processor which confirms the unmanned transport device entering or passing through the confluence, performs an algorithm for controlling line guide to prevent the unmanned transport devices from colliding with each other, and performing all control operations for the LED driving unit, the reception demodulation unit, the state display unit, and the power supply unit.

Preferably, the main control device further comprises a transceiver which is connected to a serial port including RS-232 or RS-422 and transmits and receives data.

Preferably, the sub-confluence control device further includes: at least one optical communication module having a light emission unit and a light reception unit for performing optical communication with the optical fiber; and a communication control module which performs wireless communication with the main confluence control device through the optical communication module, generates an entry report signal or a pass completion signal for the confluence, and determines the entry operation or the standby operation of the unmanned transport device depending on the pass control signal of the main confluence control device.

Preferably, the communication control module includes: a power input and output unit which performs input and output for power; a light transmission and reception unit which outputs a driving signal for driving the light emission unit and demodulates an analog signal received from the light reception unit into a digital signal; a state display unit which displays state information including a transmission and reception state of the signals, a power state, a communication connection state, and an error and communication state of each optical communication module; and a processor which generates the entry report signal or the pass completion signal, controls the entry operation of the unmanned transport device depending on the pass control signal or the standby operation after decelerating and stopping of the unmanned transport device, and performs all control operations for the light transmission and reception unit, the state display unit, and the power input and output unit.

Preferably, the communication control module further comprises a transceiver which is connected to a serial port including RS-232 and transmits and receives data.

According to another aspect of the invention to achieve the object described above, there is provided a method of controlling line guide for preventing unmanned transport devices from colliding with each other in an automated material handling system which transports carriers among manufacturing facilities through the unmanned transport devices, including: a step in which an optical line is formed by installing a side light emission optical fiber in the whole section of the line of a confluence of a plurality of lines of lines for moving the unmanned transport devices, and the unmanned transport device performs wireless communication through one side of the optical fiber in the whole optical line section while moving on the optical line to transmit entry state or pass completion state information to a main confluence control device; a step in which the main confluence control device installed at the confluence is connected to one end of the optical fiber of the optical line and performs optical communication, to confirm an entry state or a pass completion state of the unmanned transport device through the optical fiber installed on the confluence optical line; a step in which the main confluence control device performs, when an entry state of a new unmanned transport device is confirmed through the optical fiber of the optical line, a function of optical communication connection to a sub-confluence control device installed in the new unmanned transport device; a step in which the main confluence control device determines whether the new unmanned transport device enters for the confluence, and generates a pass control signal for a passable state or an impassable state to all the unmanned transport devices positioned at the confluence through the optical fiber on the basis of predetermined priority; and a step in which the sub-confluence control device receiving the pass control signal performs an entry operation of the unmanned transport device thereof when receiving the pass control signal for the passable state, and performs a standby operation of adjusting driving speed of the unmanned transport device thereof when receiving the pass control signal for the impassable state.

Preferably, the sub-confluence control device generates an entry report signal of reporting that the unmanned transport device enters the confluence when entering the optical line, and generates a pass completion signal of reporting that the unmanned transport device passes through the confluence when passing through the optical line.

Preferably, the main confluence control device continuously confirms whether a new unmanned transport device is entering the confluence through the optical communication while the unmanned transport device passes through the confluence.

Preferably, the method of controlling line guide of an automated material handling system further includes: a step in which the main confluence control device transmits a unique ID thereof to perform wireless communication with a sub-confluence control device of the unmanned transport device at the beginning of entry of the optical line to perform a wireless communication connection function, when the optical communication is disconnected in the break section of the optical line; a step in which the main confluence control device generates a pass control signal for a passable state or an impassable state of the unmanned transport device on the basis of predetermined priority in accordance with whether a new unmanned transport device enters the confluence, when the entry state of the unmanned transport device is confirmed through wireless communication; and a step in which the sub-confluence control device receiving the pass control signal performs an entry operation of the unmanned transport device thereof when receiving the pass control signal for the passable state, and performs a standby operation of adjusting speed of the unmanned transport device thereof when receiving the pass control state for the impassable state.

Preferably, after the sub-confluence control device performs wireless communication with the main confluence control device to collect state information of the main confluence control device, the collected state information is reported to a higher-level system.

BRIEF DESCRIPTION OF THE DRAWINGS

The above and other objects, features and advantages of the present invention will be more apparent from the following detailed description taken in confluence with the accompanying drawings, in which.

DETAILED DESCRIPTION OF THE PREFERRED EMBODIMENT

Figure 1:
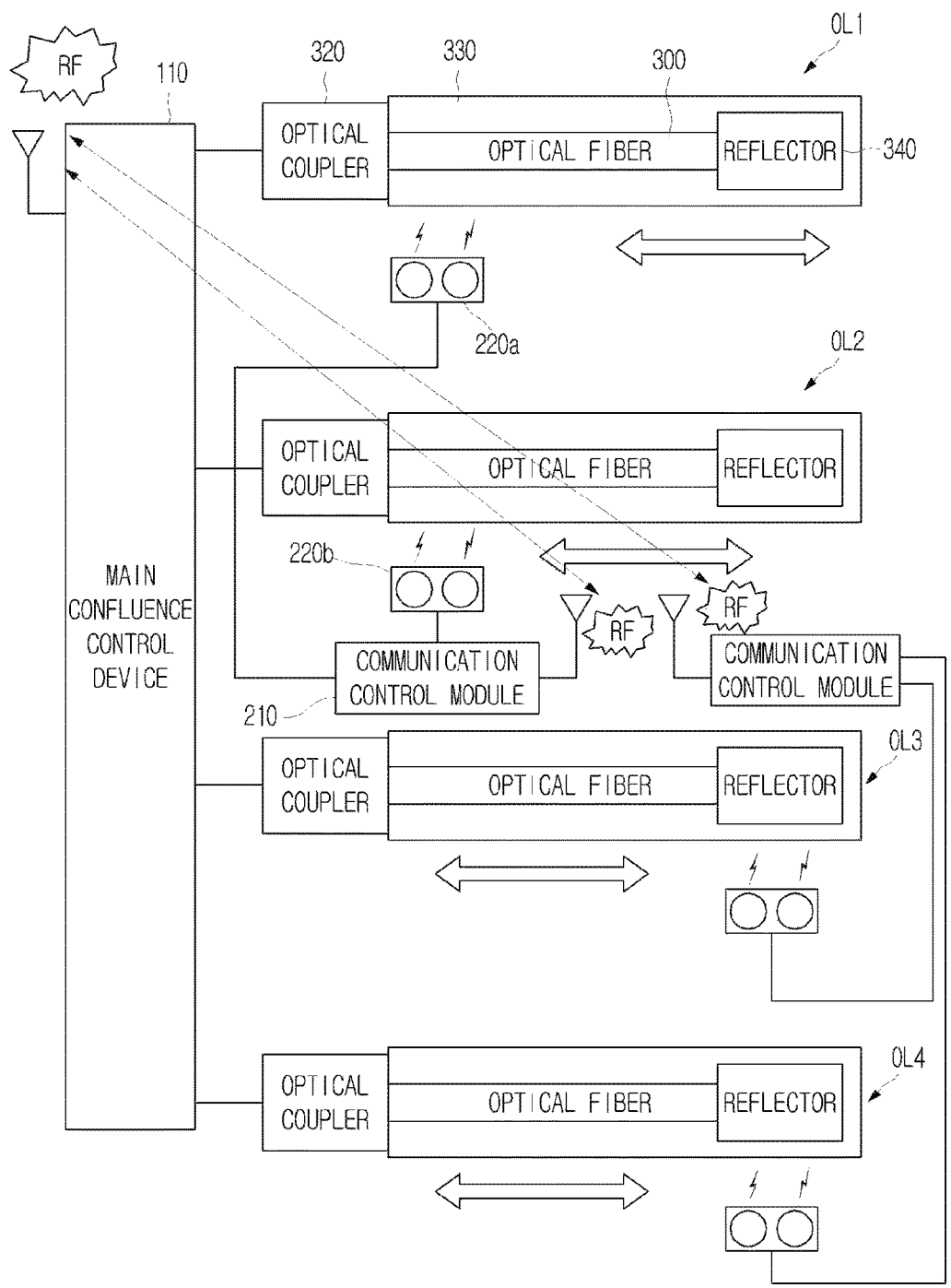
FIG. 1 is a diagram illustrating a configuration of an apparatus for controlling line guide of an automated material handling system according to an embodiment of the present invention.

Since the description of the present invention is a mere embodiment for structural and functional description, it must not be interpreted that the scope of the present invention is limited by the embodiments described in the text. That is, since the embodiments can be variously changed and have various forms, it should be understood that the scope of the invention includes the equivalents for realizing the technical concept. Also, since the specific embodiments do not include all objects and effects presented by the present invention, the scope of the present invention is not limited by them.

This invention can be implemented in many different forms without departing from technical aspects or main features.

Therefore, the implementation examples of this invention are nothing more than simple examples in all respects and will not be interpreted restrictively.

Even though the terms such as 1, 2, and others can be used to explain many components, the above components shall not be limited by the above terms.

The above terms are used only to distinguish one component from the other component.

For example, the first component can be named the second component without departing from the scope of rights in this invention. Similarly, the second component can be named the first component.

The term called "and/or" includes the combination of the plural described and related items or a certain item of the plural described and related items.

When it is mentioned to be "connected" or "linked" to the other component, a certain component may be connected or linked to the other component. However, it will be understood that there may be some other components between them.

On the other hand, when it is mentioned to be directly "connected" or "linked" to the other component, a certain component will be understood that no other component exists between them.

The terms used in this application do not intend to limit this invention, but are used only to explain specific implementation examples.

The singular expression includes plural expressions unless it is apparently different in the context.

The terms such as "include", "equipped" or "have" in this application intend to designate that the feature, number, stage, movement, component, part or the combination described in the specification exist.

Therefore, it will be understood that the existence or the additional possibility of one or more than one different features, numbers, stages, actions, components, parts and the combination is not excluded in advance.

Unless differently defined, all the terms used here including technical or scientific terms have the same meaning with what is generally understood by one who has common knowledge in the technical field that this invention belongs to.

The terms such as those defined in the dictionary commonly used will be interpreted to have the meanings matching with the meanings in the context of the related technologies. Unless clearly defined in this application, they are not interpreted as ideal or excessively formal meanings.

The desirable implementation examples in accordance with this invention are explained in detail in reference to the drawings attached below. But, the same reference numbers are given to the same or corresponding components regardless of drawing codes and repeated explanations will be omitted.

The detailed description about the prior related technology will also be omitted when it is judged to blur the gist of this invention in explaining this invention.

Figure 2A:
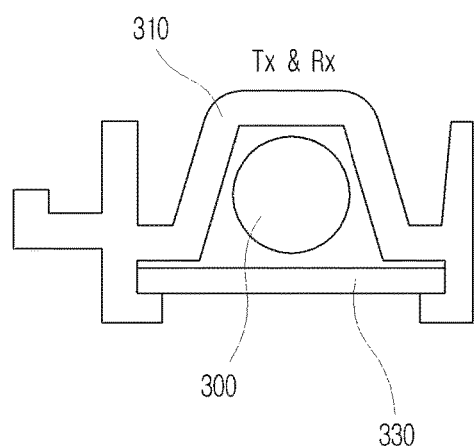
FIG. 2A and FIG. 2B are diagrams illustrating an installation state of an optical line illustrated in FIG. 1.
Figure 2B:
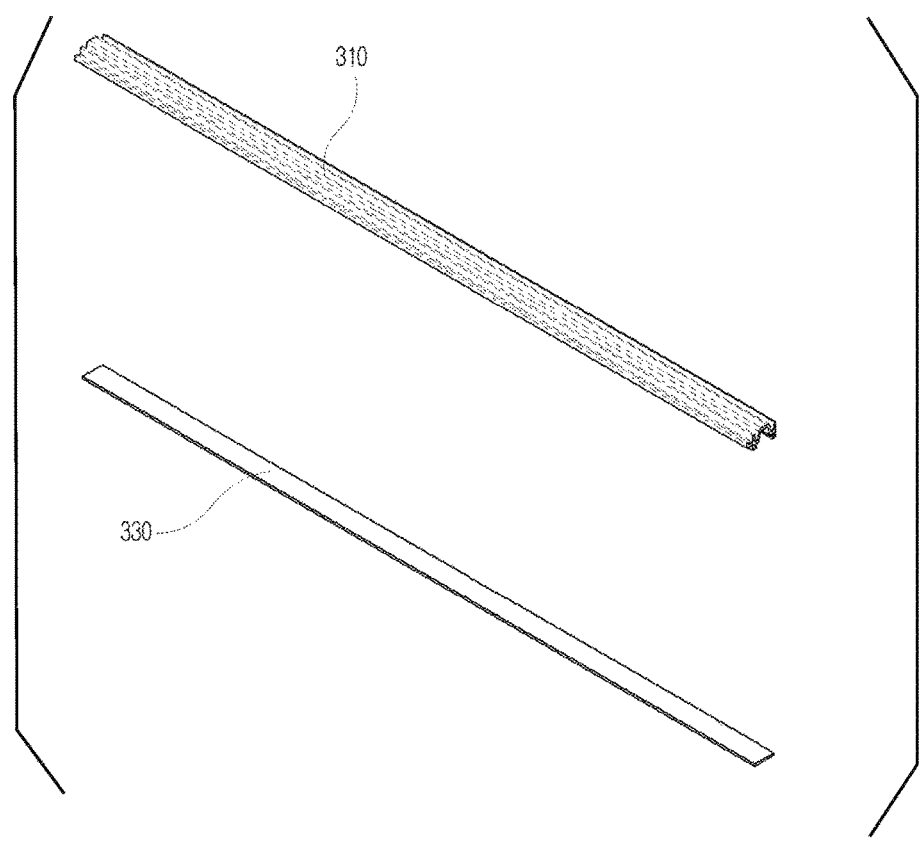
Figure 3:
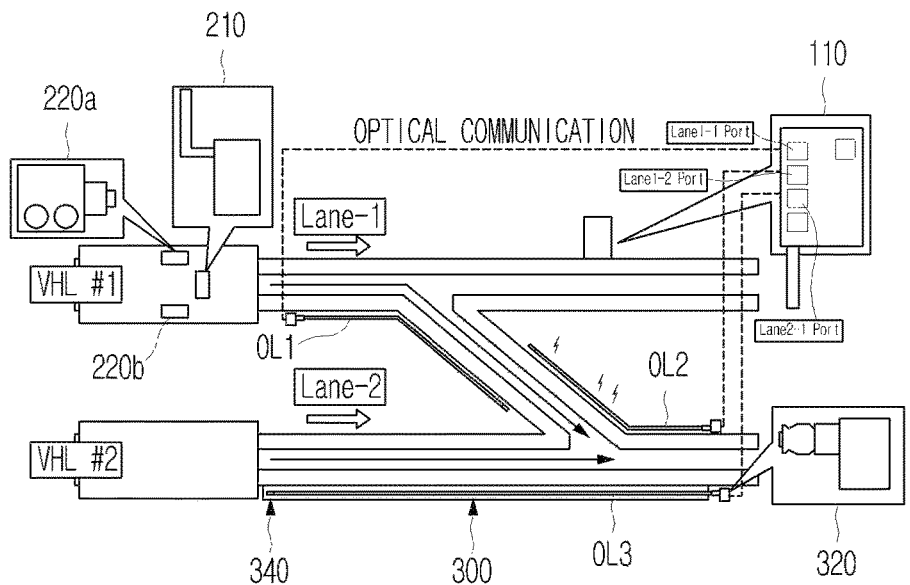
FIG. 3 is a diagram illustrating a line installation state of a main confluence control device illustrated in FIG. 1 and a sub-confluence control device.
Figure 4:
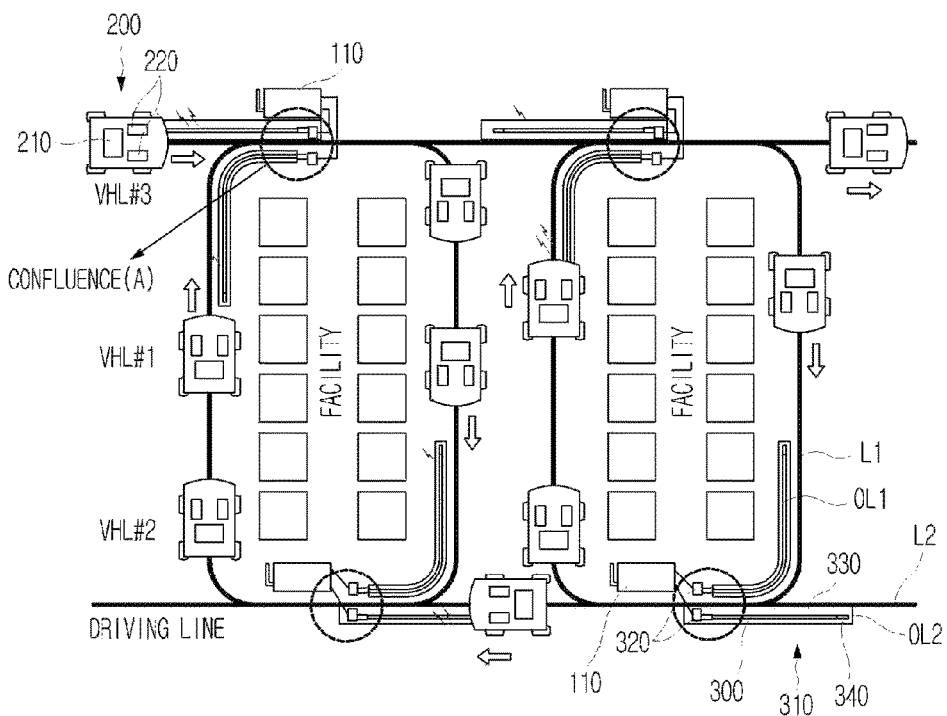
FIG. 4 is a diagram illustrating a state in which an apparatus for controlling line guide of an automated material handling system according to an embodiment of the present invention is disposed on a factory line.

FIG. 1 is a diagram illustrating a configuration of an apparatus for controlling line guide of an automated material handling system according to an embodiment of the present invention, FIG. 2A and FIG. 2B are diagrams illustrating an installation state of an optical line illustrated in FIG. 1, FIG. 3 is a diagram illustrating a line installation state of a main confluence control device illustrated in FIG. 1 and a sub-confluence control device, and FIG. 4 is a diagram illustrating a state in which an apparatus for controlling line guide of an automated material handling system according to an embodiment of the present invention is disposed on a factory line.

Referring to FIG. 1 to FIG. 4, the apparatus for controlling line guide of automated material handling system includes optical lines (OL1, OL2, OL3, and OL4) installed at a plurality of confluences, a main confluence control device (110), and a sub-confluence control device (200).

The optical lines (OL1 to OL4) are provided with an optical fiber (300) with a predetermined length (for example, about 1,200 mm) on each line of a confluence (A) at two lines of lines on which an unmanned transport device (20) moves. Such optical lines (OL1 to OL4) use a side light emission optical fiber (300) to perform optical communication through one side thereof. In other words, a reflection cover (310) fixed to the optical line is provided with a transparent body (330) for fixing the optical fiber (300), and optical communication is performed through the transparent body (330).

As illustrated in FIG. 2A and FIG. 2B, such optical lines (OL1 to OL4) include a reflection cover (310), a transparent body (330), an optical coupler (320), and a reflector (340).

The reflection cover (310) is provided with an inner accommodation space in a shape corresponding to the outer surface of the optical fiber (300), and fixes the optical fiber (300) so as not to deviate from the optical line. The reflection cover (310) is formed in a hat shape to easily install an optical fiber and to improve efficiency of light transmission and light reception. Such a reflection cover (310) is formed in a side reflective mirror structure to improve optical efficiency of a light emission unit and a light reception unit.

The transparent body (330) is installed on the opposite side of the reflection cover (310), and allows light input or output from the optical fiber to be reflected to the reflection cover (310).

The optical coupler (320) is installed at the end of one side of the optical fiber, and is connected to the main confluence control device (110) in a circuit to perform optical communication with the sub-confluence control device (200).

The reflector (340) is installed at the end of the other side of the optical fiber (300), and reflects light such that light output from the optical coupler (320) or the first and second optical communication modules (220a and 220b) are not output through the end of the optical fiber, to increase the intensity of an optical signal.

Such an optical line is easily installed in a curved line section as well as a linear section equal to or more than a predetermined length. Generally, for optical communication in a predetermined length, it can be considered to provide a light guide plate. Currently, since a light guide plate is processed with the maximum length of about 2 m, an optical line is embodied by a method of connection a plurality of light guide plates if more than a predetermined length is required. However, optical loss generated in the connection section of the light guide plates is large when the optical line is embodied through the connection of light guide plates. As a result, it is difficult to embody the optical line in a long section equal to or more than a predetermined length or a curved section. In the present invention, such a problem is simply solved through an optical fiber.

In addition, in the present invention, an installation length of an optical line is made longer than the existing installation length. Accordingly, when there is no other unmanned transport device at a confluence, the unmanned transport device (20) can enter and pass through the confluence at the maximum driving speed, and even in a situation to decelerate and stop at the confluence to perform a standby operation, it is possible to make driving flow of the unmanned transport device (20) smooth through a method of installing the optical line longer than the stopping distance. For example, in the case of a system in which an optical line is embodied by using a light guide plate with the maximum length of 2 m and an unmanned transport vehicle which moves at 5 m/sec is applied, a deceleration distance of the unmanned transport vehicle requires to be about 5 m or more. Accordingly, deceleration has to be performed from the position before the position where the optical line is installed. Such unconditional deceleration driving at the confluence decreases work efficiency of the overall system, and as a result, it is difficult to apply the system to a logistics system or the like which are provided with unmanned moving vehicles gradually increasing in speed. In other words, in the present invention, it is possible to embody an optical line without restriction in length through an optical fiber. Accordingly, it is possible to drive an unmanned transport vehicle at a high speed without decreasing a speed even in entering a confluence by appropriately setting the length of the optical line in consideration of the speed of the unmanned transport vehicle and the position of the confluence in the system.

The main confluence control device (110) is installed on one side of the optical lines (OL1 to OL4), and outputs a pass control signal depending on predetermined priority to the unmanned transport device (20) entering the confluence (A) through optical communication. Such a main confluence control device (110) includes four ports (Lane 1-1 port, Lane 1-2 port, Lane 2-1 port, and Lane 2-2 port) to transmit and receive the optical signal to and from two lines (Lane 1 and Lane 2).

The sub-confluence control device (200) is installed in the unmanned transport device (20), and performs optical communication with the main confluence control device (110) to control the unmanned transport device (20) to perform an entry operation or a standby operation for the confluence (A) depending on the pass control signal.

Such a sub-confluence control device (200) includes a communication control module (210), first and second optical communication modules (220a and 220b), and the communication control module (210) is electrically connected to the first and second optical communication modules (220a and 220b).

The communication control module (210) performs an optical communication connection function at the time of entering the confluence (A), performs an optical communication disconnection function at the time of passing through the confluence (A), and transmits an entry report signal for reporting entering the confluence (A) to the unmanned transport device (20), to be applied to an entry or standby operation of the unmanned transport device (20).

Figure 5:
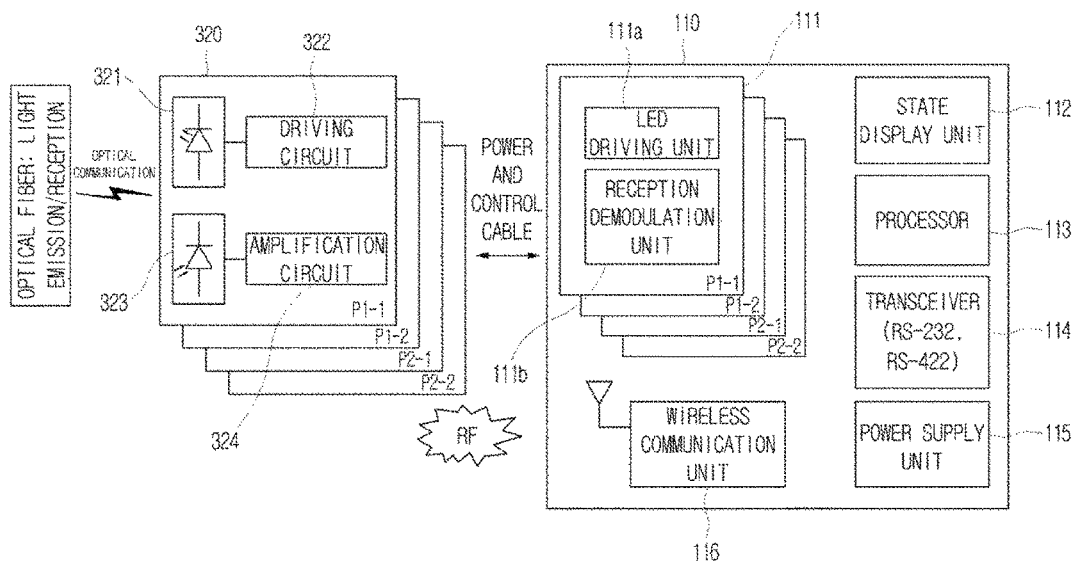
FIG. 5 is a block diagram illustrating a configuration of the main confluence control device illustrated in FIG. 1.
Figure 6:
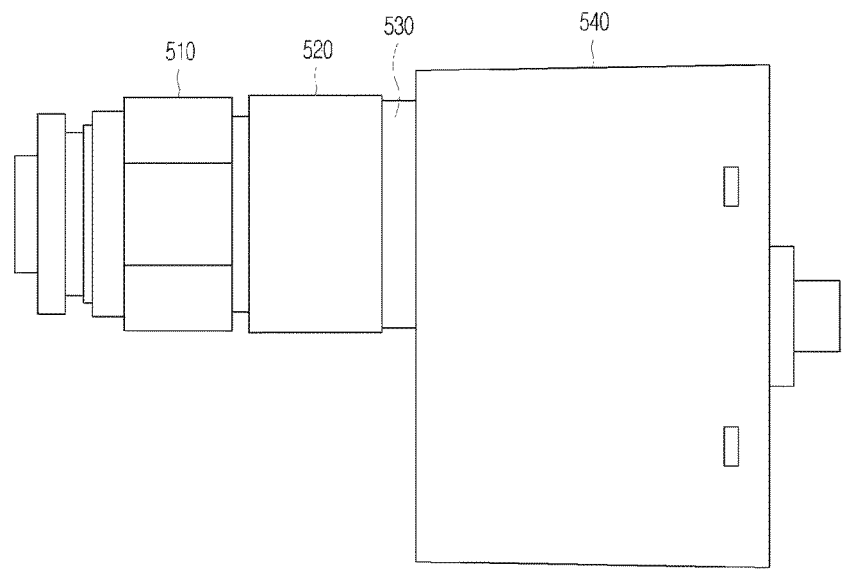
FIG. 6 is a diagram illustrating a configuration of the optical coupler illustrated in FIG. 5.

FIG. 5 is a block diagram illustrating a configuration of the main confluence control device illustrated in FIG. 1, and FIG. 6 is a diagram illustrating a configuration of the optical coupler illustrated in FIG. 5.

Referring to FIG. 5 and FIG. 6, the main confluence control device (110) includes an LED driving unit (111a), a reception demodulation unit (111b), a state display unit (112), a processor (113), a transceiver (114), a power supply unit (115), and a wireless communication unit (116), and the main confluence control device (110) is connected to the optical coupler (320) through a power and control cable.

The LED driving unit (111a) outputs a driving pulse signal for driving a light emission unit (321) of the optical coupler (320), and the reception demodulation unit (111b) demodulates an analog signal received from a light reception unit (323) of the optical coupler (320), into a digital signal.

Such an LED driving unit (111a) and a reception demodulation unit (111b) constitute a communication circuit (111) for optical communication with the optical coupler (320), and the communication circuits (111) are provided as many as the number of the optical couplers (320) connected through cables.

The state display unit (112) displays state information such as a power state, a communication state, an error state, and a serial port connection state.

The processor (113) is provided with an algorithm for controlling line guide therein, and confirms the unmanned transport device (20) entering or passing through the confluence (A) to prevent the unmanned transport devices (20) from colliding with each other.

The transceiver (114) is connected to a serial port such as RS-232 or RS-422, and transmits and receives data.

The power supply unit (115) supplies power necessary to drive the main confluence control device (110).

The wireless communication unit (116) collects the state information of the main confluence control device (110), transmits the collected information to a higher-level system, and outputs a pass control signal depending on predetermined priority to the unmanned transport device (20) entering the confluence through wireless communication at the time of disconnecting optical communication in a break section of an optical line on which an optical line can be installed.

Meanwhile, the optical coupler (320) includes a light emission unit (321), a light reception unit (323), a driving circuit (322) which provides a driving pulse for driving the light emission unit (321), and an amplification circuit (324) which amplifies and outputs an optical signal passing through the light reception unit (323).

As illustrated in FIG. 6, such an optical coupler (320) includes a fixing means (510), a guide means (520), a stopper (530), and an integrated board (540).

The fixing means (510) fixes the optical fiber (300) so as not to be separated, and the guide means (520) guides a side reflection path of the optical fiber (300) and an insertion path of the optical fiber (300).

The stopper (530) restricts an insertion depth of the optical fiber (300) into the optical coupler (320) to be constant, and the inside thereof is processed to be a reflector to improve optical reflection efficiency.

The integrated board (540) is integrally provided with the light emission unit (321) and the light reception unit (323) to use one optical fiber (300), and includes a light emission unit (321), a light reception unit (323), a driving circuit (322), and an amplification unit (324).

Meanwhile, a side reflector (not illustrated) is installed at the front end of the integrated board (540), and increases optical efficiency of the light emission unit (321) and the light reception unit (323).

Figure 7:
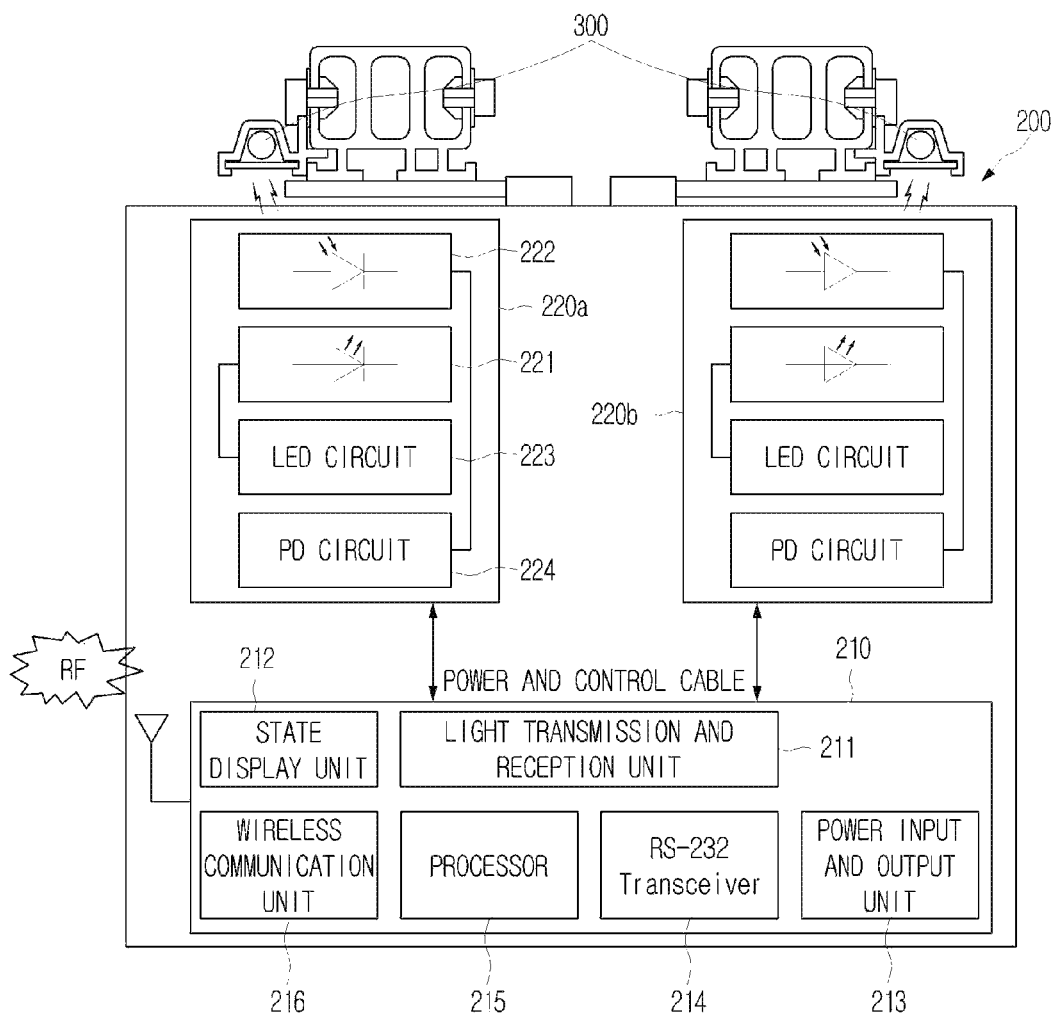
FIG. 7 is a block diagram illustrating a configuration of the sub-confluence control device illustrated in FIG. 1.
Figure 8A:
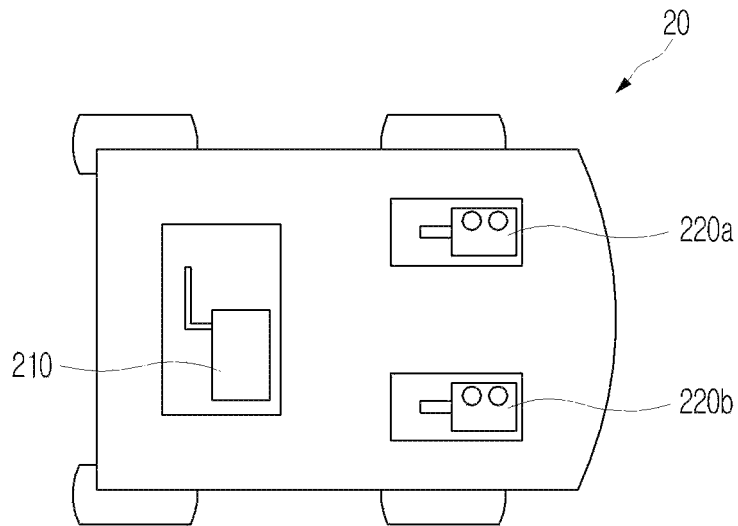
FIG. 8A and FIG. 8B are diagrams illustrating an exterior of the sub-confluence control device illustrated in FIG. 7.
Figure 8B:
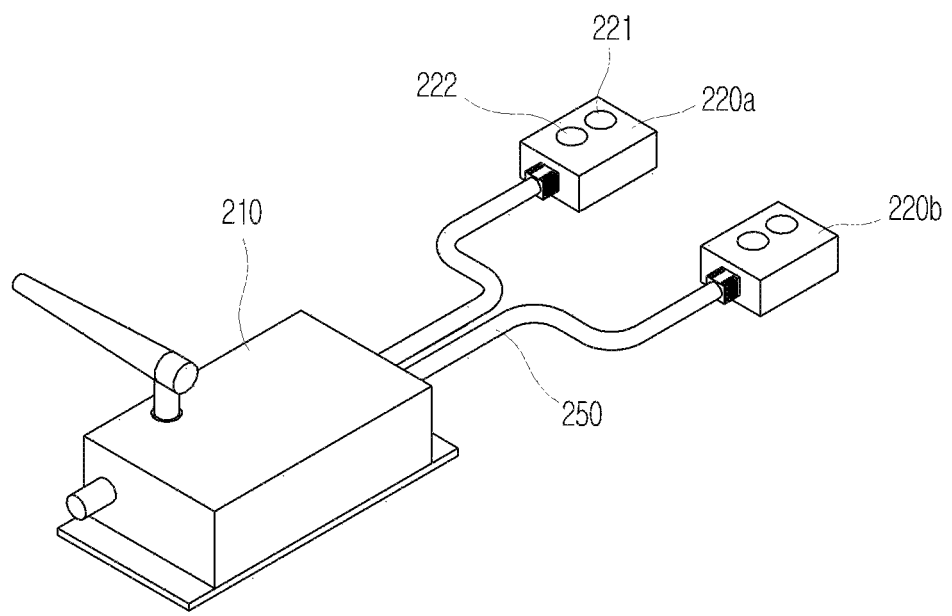

FIG. 7 is a block diagram illustrating a configuration of the sub-confluence control device illustrated in FIG. 1 and FIG. 8A and FIG. 8B are diagrams illustrating an exterior of the sub-confluence control device illustrated in FIG. 7.

Referring to FIG. 7 and FIGS. 8A and 8B, the sub-confluence control device (200) is provided with a light reception unit (222) and a light emission unit (221) in first and second optical communication modules (220a and 220b), the communication control module (210) includes a light transmission and reception unit (211), a state display unit (212), a power input and output unit (213), a transceiver (214), a processor (215), and a wireless communication unit (216), and the communication control module (210) is electrically connected to the first and second optical communication modules (220) through power and control cables (250).

The light transmission and reception unit (211) outputs a driving pulse for driving the light emission unit (221), and demodulates an analog signal received from the light reception unit (222), into a digital signal.

The state display unit (212) displays a transmission/reception state, a power state, a communication or cable connection state, an error/communication state of the first optical communication module (220a), and an error/communication state of the second optical communication module (220b).

The power input and output unit (213) takes charge of input and output for power of 24 V, and the transceiver (214) is connected to a serial port such as RS-232, and transmits and receives data.

The processor (215) generates an entry report signal of reporting entry into the confluence (A) and a pass completion signal of reporting a pass completion state for the confluence (A), and receives the pass control signal to control the unmanned transport device (20) to perform an entry or standby operation.

The wireless communication unit (216) receives the pass control signal through wireless communication with the wireless communication unit (116) of the main confluence control device (110) at the time of optical communication break, and transmits an entry report signal or a pass completion signal.

Figure 9:
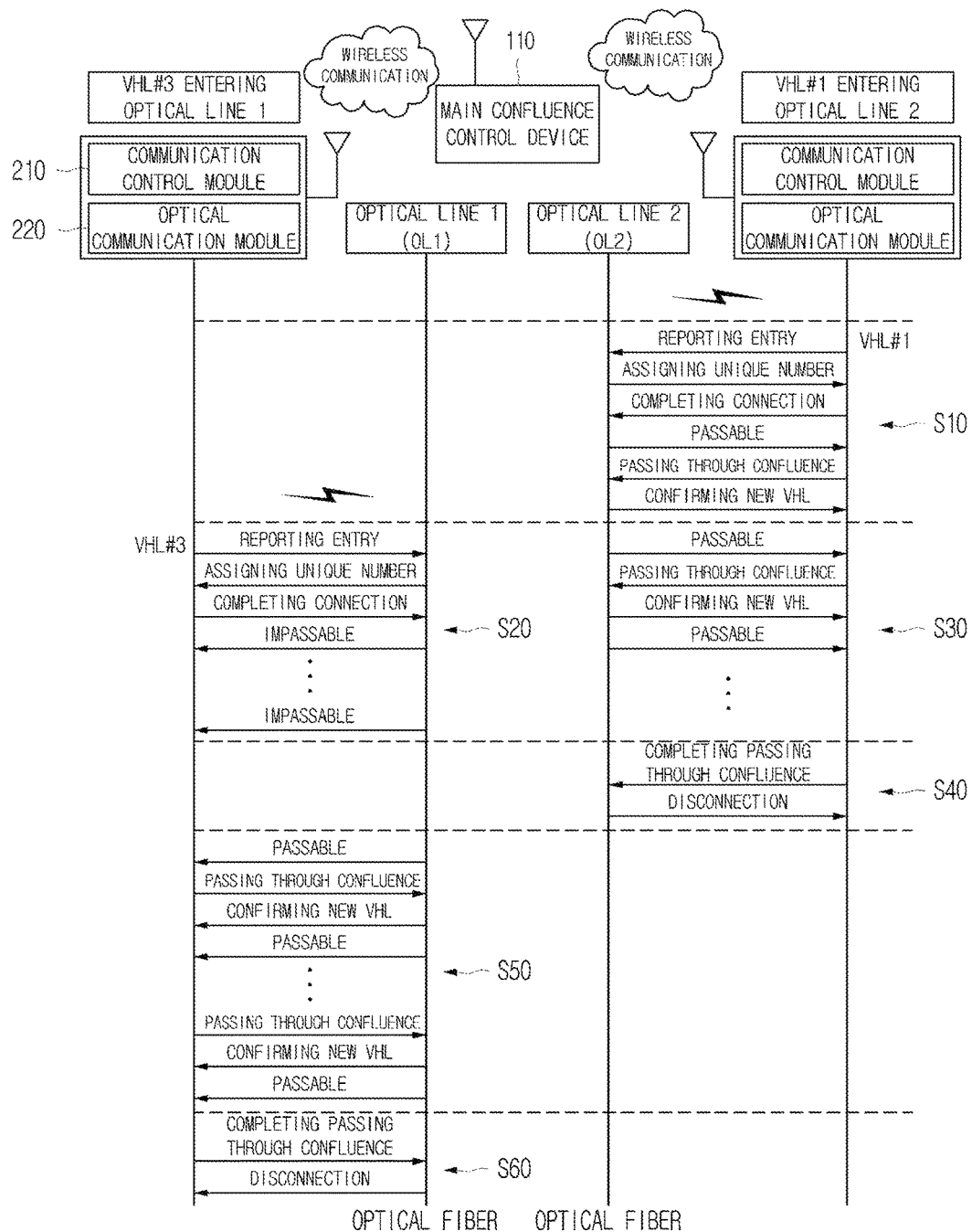
FIG. 9 is a flowchart illustrating a method of controlling line guide of an automated material handling system according to an embodiment of the present invention.

FIG. 9 is a flowchart illustrating a method of controlling line guide of an automated material handling system according to an embodiment of the present invention, and FIG. 10A to FIG. 10G is a diagram illustrating a pass control state of an unmanned transport device at a confluence through optical communication between the main confluence control device and the sub-confluence control device illustrated in FIG. 9.

Figure 10A:
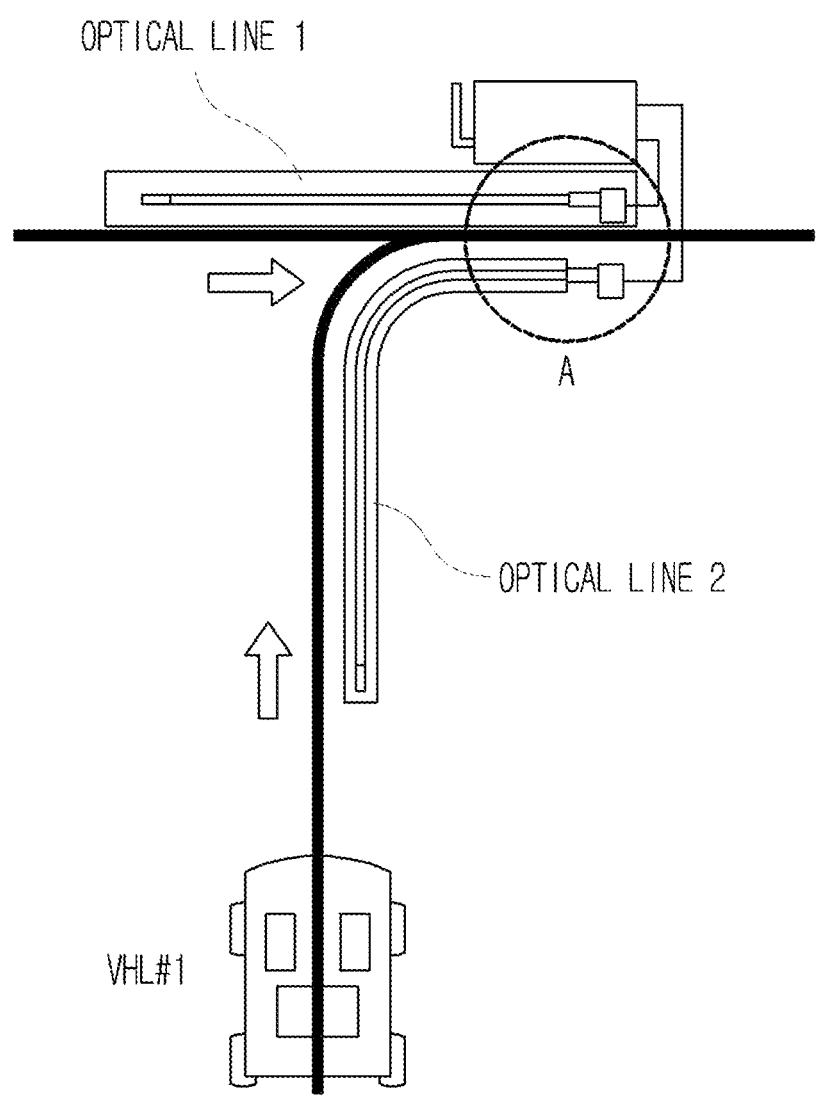
FIG. 10A to FIG. 10G are diagrams illustrating a pass control state of an unmanned transport device at a confluence through optical communication between the main confluence control device and the sub-confluence control device illustrated in FIG. 9.

Referring to FIG. 9 and FIGS. 10A to 10G, in the method of controlling line guide of an automated material handling system, when there is no unmanned transport device entering a confluence in which an optical line 1 and an optical line 2 are installed, optical communication is not performed between the main confluence control device (110) and the sub-confluence control device (200) (FIG. 10A)

Figure 10B:
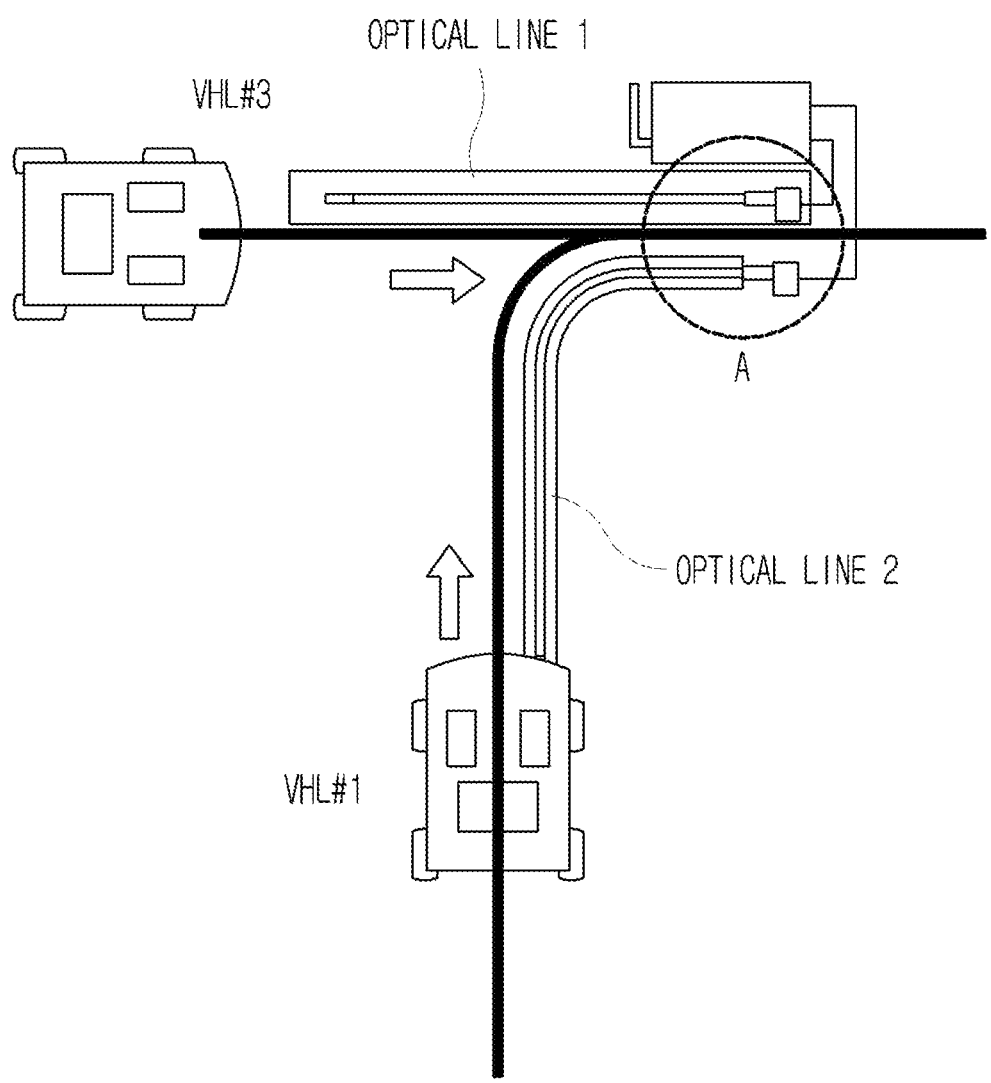

When a first unmanned transport device (VHL#1) enters an optical line 2, the sub-confluence confluence control device (200) provided in the first unmanned transport device transmits a first entry report signal through the optical communication module, the main confluence control device (110) assigns a unique number (ID_1) to the first unmanned transport device and transmits a pass control signal of reporting a passable state to the sub-confluence control device (200) after completing optical communication, and the sub-confluence control device (200) passes through the confluence depending on the pass control signal (S10, FIG. 10B). In this case, since there is no unmanned transport device which is passing on the second optical line, the first unmanned transport device (VHL#1) can pass through the optical line 2 while keeping the current driving speed.

The main confluence control device (110) confirms whether a new unmanned transport device (VHL) is entering the confluence (A), and the sub-confluence control device (200) of the third unmanned transport device (VHL#3) transmits a third entry report signal while the third unmanned transport device (VHL#3) enters the optical line 1 of the confluence. The main confluence control device (110) receives the third entry report signal, then assigns a unique number (ID_3) to the third unmanned transport device, and transmits a pass control signal of reporting an impassable state to the sub-confluence control device (200) after completing optical communication connection, and the sub-confluence control device (200) performs a standby operation such as decelerating or stopping at the confluence depending on the pass control signal (S20).

Figure 10C:
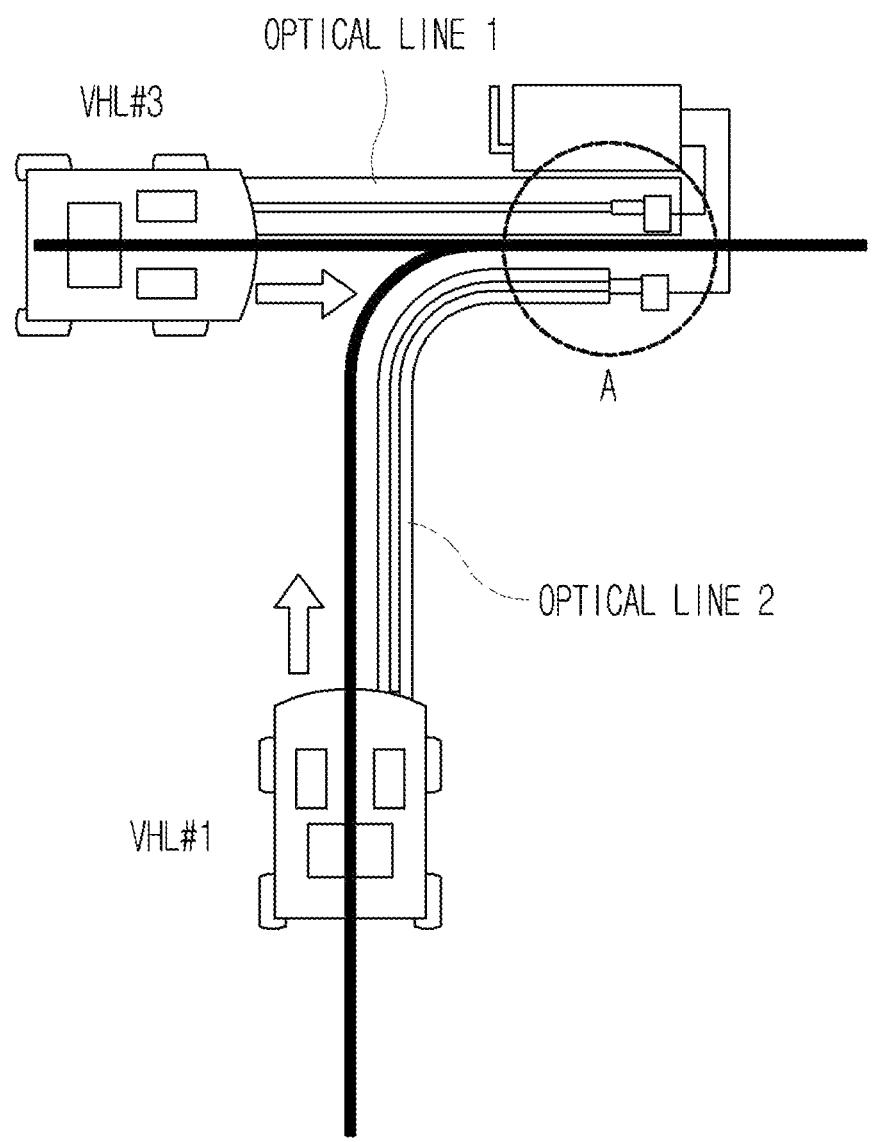
Figure 10D:
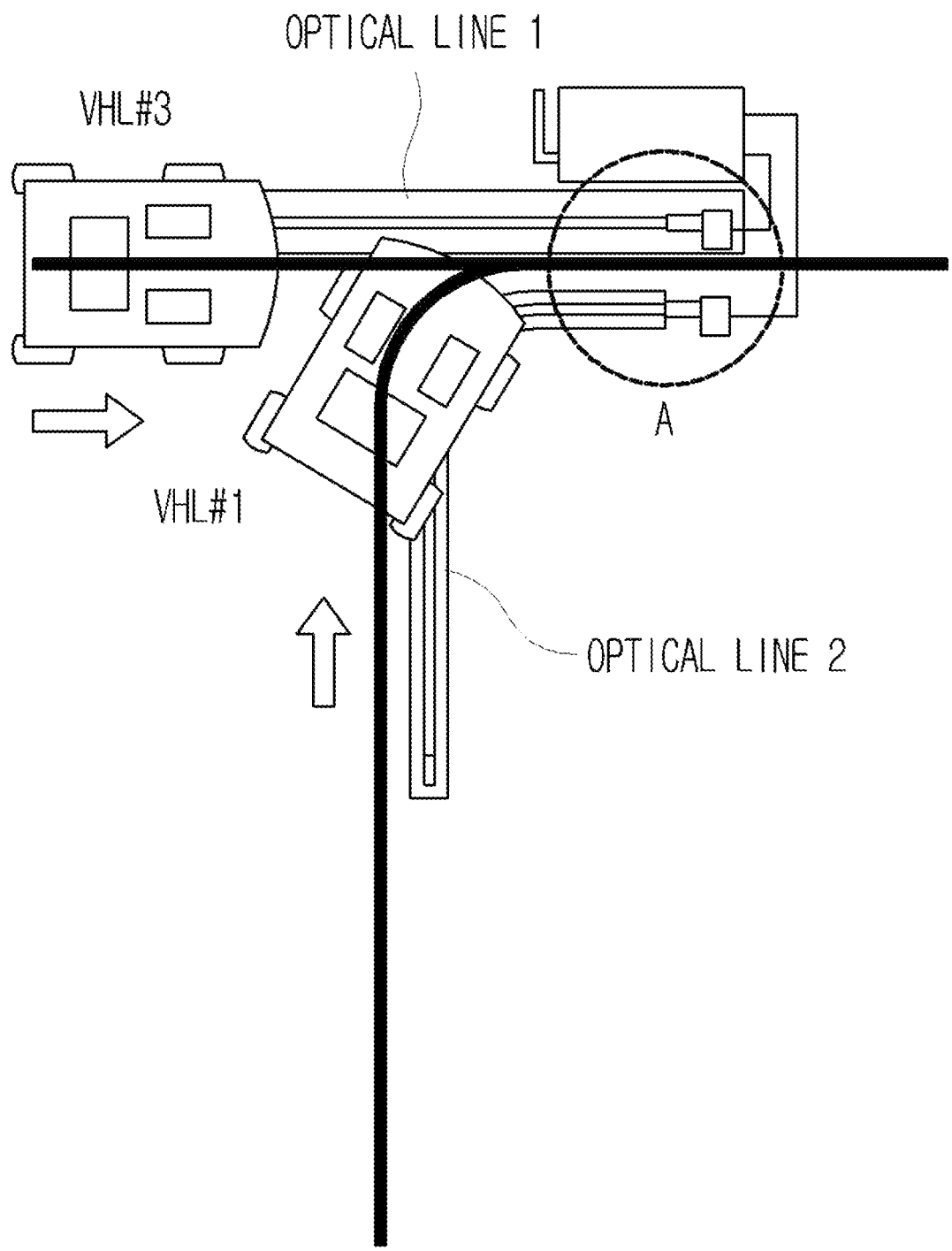

In this case, the sub-confluence control device of the third unmanned transport device continuously maintains the optical communication connection state with the main confluence control device as illustrated in FIG. 10C, and the first unmanned transport device entering the optical line 2 passes through the optical line 1 of the confluence as illustrated in FIG. 10D.

Figure 10E:
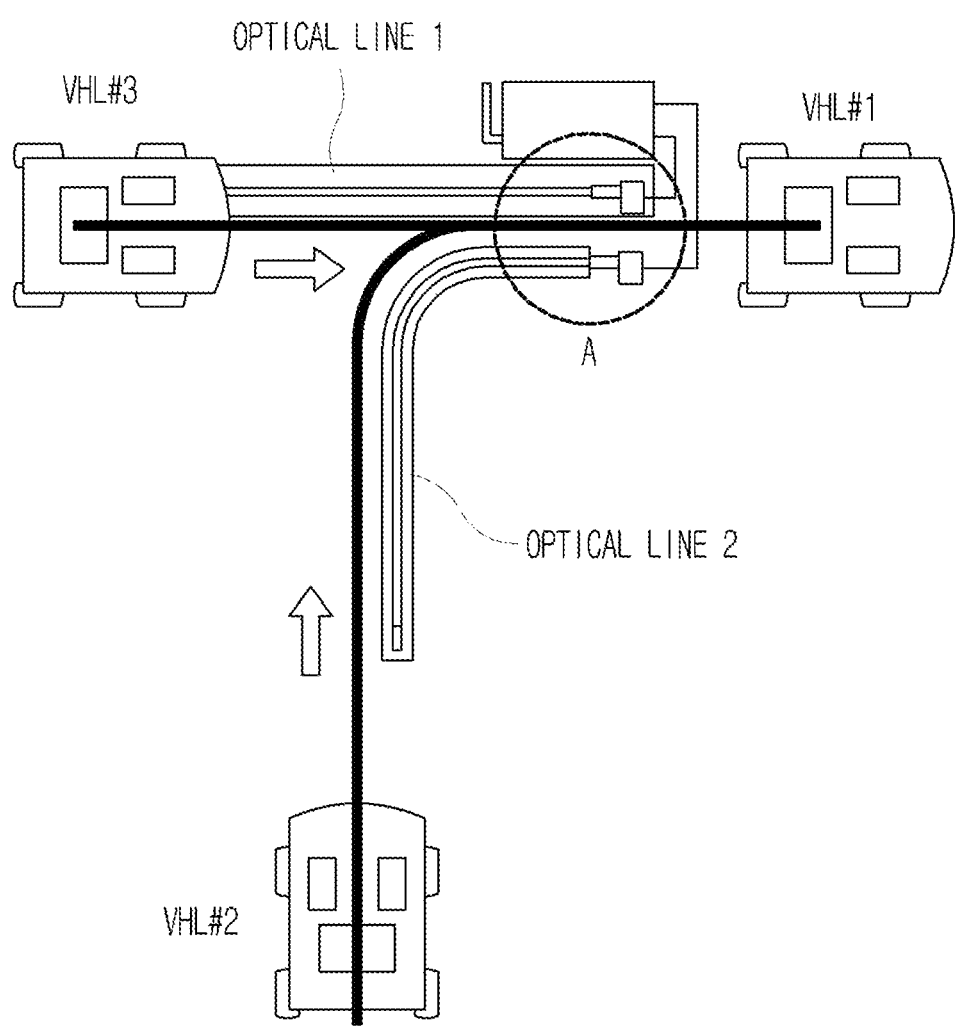

As illustrated in FIG. 10E, when the first unmanned transport device passes through the confluence and then transmits a first pass completion signal, the optical communication between the main confluence control device and the sub-confluence control device of the first unmanned transport device is disconnected (S30).

Figure 10F:
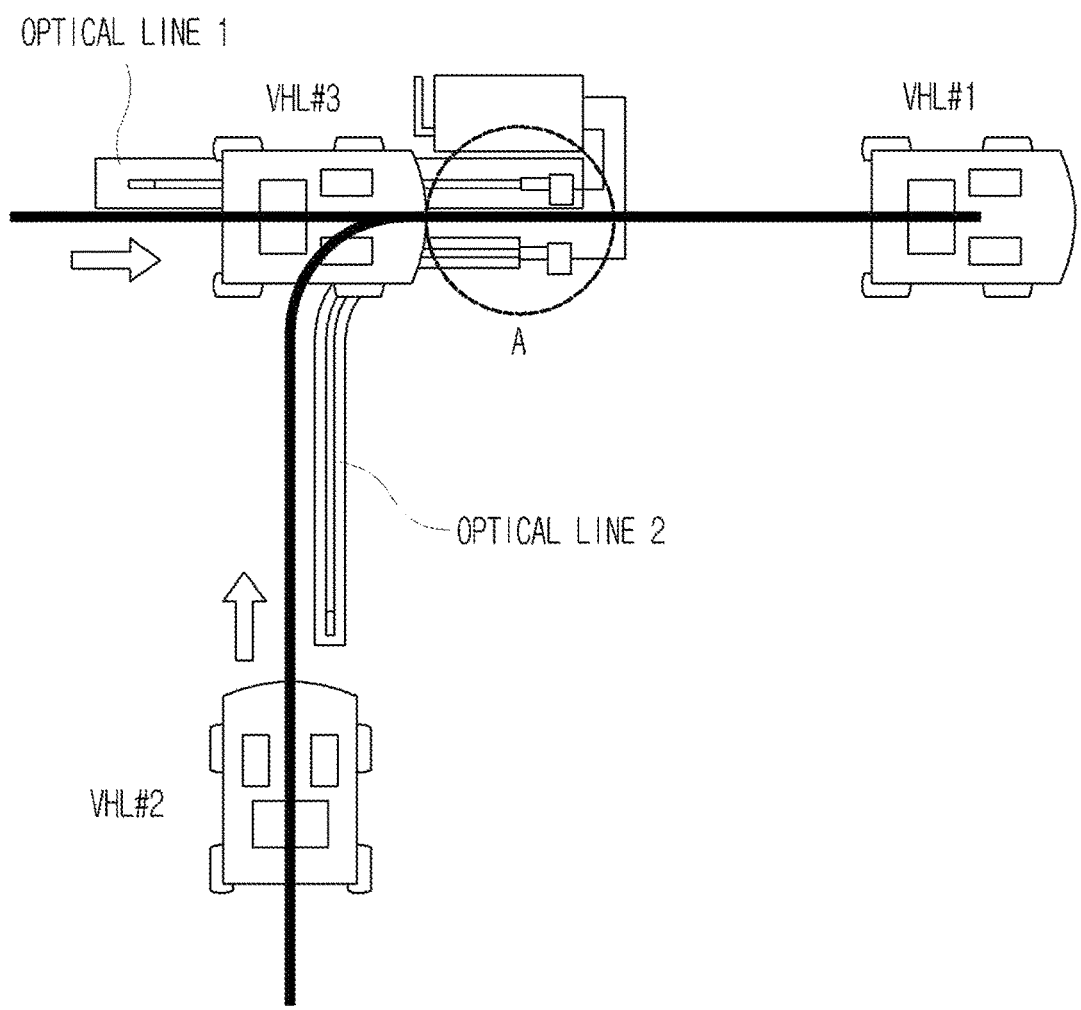

As illustrated in FIG. 10F, the main confluence control device transmits a pass control signal reporting a passable state to the third unmanned transport device, and the third unmanned transport device passes through the confluence depending on the pass control signal (S40). In this case, the main confluence control device continuously confirms whether a new unmanned transport device is entering the confluence while the third unmanned transport device (20) passes through the confluence.

Figure 10G:
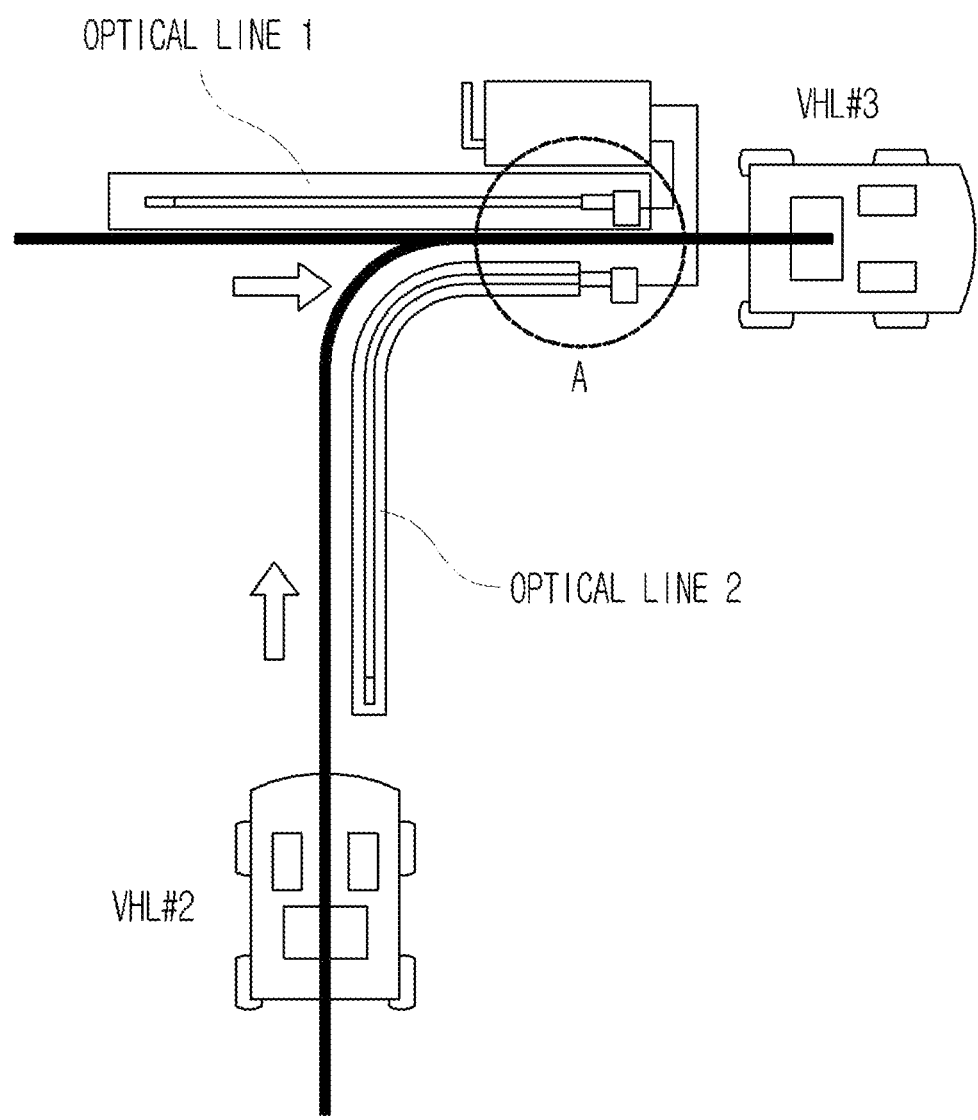

As illustrated in FIG. 10G, the main confluence control device disconnects the optical communication with the sub-confluence control device of the third unmanned transport device when receiving the third pass completion signal from the third unmanned transport device (S50).

The main confluence control device may assign priority for the confluence according to order of receiving an entry report signal. However, when two unmanned transports devices simultaneously enter the confluence, the main confluence control device may assign priority depending on whether there is a subsequent unmanned transport device.

Figure 11:
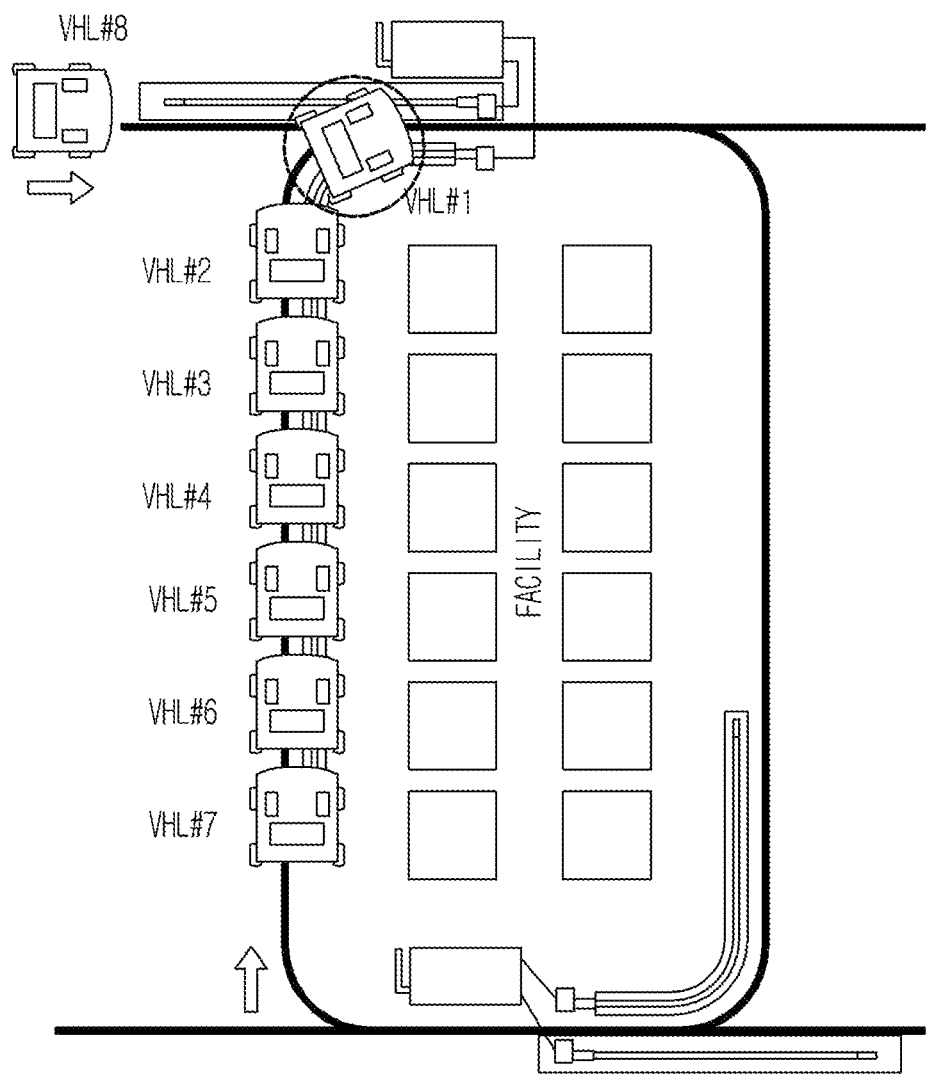
FIG. 11 is a diagram illustrating a status in that a main confluence control device performs optical communication with all unmanned transport device positioned on the optical lines and a plurality of unmanned transport devices can simultaneously drive without collision on the optical line of the confluence according to an embodiment of the present invention.

In other words, as illustrated in FIG. 11, when the second unmanned transport device consecutively enters the optical line 2 through which the first unmanned transport device is passing, the main confluence control device connects optical communication with the sub-confluence control device of the second unmanned transport device in a state of maintaining the communication with the sub-confluence control device of the first unmanned transport device to allow the unmanned transport devices entering the optical line 2 to continuously pass. As described above, the main confluence control device performs optical communication with all unmanned transport device positioned on the optical lines, and the plurality of unmanned transport devices can simultaneously drive without collision on the optical line of the confluence.

Meanwhile, the optical communication may be broken in a section in which it is difficult to consecutively install optical lines such as a curved section of line. Accordingly, in the optical communication break section, the main confluence control device (110) and the sub-confluence control device (200) automatically transmit and receive an entry report signal, a pass control signal for a passable or impassable state, and a pass completion signal by the method of controlling line guide illustrated in FIG. 9 by using the wireless communication unit.

When the main confluence control device and the sub-confluence control device perform wireless communication, a wireless ID of the main confluence control device is transmitted and received together when assigning a unique number for optical communication connection, and both of wireless communication and optical communication are possible. The wireless communication unit of the main confluence control device transmits the unique ID thereof to the wireless communication unit of the sub-confluence control device to prevent crosstalk with the other main confluence control device from occurring.

In addition, in the present invention, even when an additional communication device such as a wireless LAN, a wired LAN, or serial communication is not installed, the unmanned transport device collects state information of the main confluence control device, that is, information such as internal temperature, current, voltage, optical signal intensity, and optical communication state through the wireless communication unit of the sub-confluence control device, and the information collected as described above is reported to a higher-level system to efficiently manage the main confluence control devices installed in the whole factory lines.

Accordingly, it can perform simultaneous confluence control for a plurality of unmanned transport devices positioned on the same line since an optical line is disposed by using a side light emission optical fiber, which has an optical line is easily installed even in a curved section, have an optical line installed to be longer than the existing optical line such that the unmanned transport device can enter and pass through the confluence at the maximum driving speed, and allow a driving flow of the unmanned transport device to be smooth by installing the optical line to be longer than a stopping distance when decelerating and stopping at the confluence and performing a standby operation.

Also, it can perform a wireless communication function in a break section of an optical line or a section in which optical communication connection is impossible and perform a control operation for a passable state or an impassable state at a confluence, thereby stably performing a confluence control.

In addition, state information of a main confluence control device is collected through wireless communication even without an additional communication device, and the collected state information is reported to a higher-level system, thereby integrally managing the main confluence control device.

Although embodiments of the present invention were described above, the spirit of the present invention is not limited thereto, changes and modifications substantially equivalent to the embodiment of the present invention should be construed as being included in the scope of the present invention, and the prevent invention may be changed in various ways within the scope of the present invention by those skilled in the art.

What is claimed is:

1. An apparatus for controlling line guide of an automated material handling system to prevent unmanned transport devices which transport carriers among manufacturing facilities from colliding with each other, comprising:
   a plurality of optical lines in which a side light emission optical fiber is installed in a whole section of a confluence of a plurality of lines of lines for moving the unmanned transport devices, and which performs optical communication with the unmanned transport devices through one side of the optical fiber, wherein one end of the optical fiber is connected to a main confluence control device, thereby performing optical communication between an unmanned transport device moving on a line and the main confluence control device in the whole section of the line on which the optical fiber is installed;
   a main confluence control device which is installed at the confluence, performs optical communication with the unmanned transport device through the optical line to confirm an entry state or a pass completion state of the unmanned transport device for the confluence, and outputs a pass control signal for a passable or an impassable state depending on predetermined priority when a plurality of unmanned transport device enter the confluence; and
   a sub-confluence control device which is installed in the unmanned transport device, performs optical communication with the main confluence control device through the optical line to report an entry state or a pass completion state for the confluence, and controls the unmanned transport device to perform an entry operation or a standby operation depending on the pass control signal.

2. The apparatus for controlling line guide of an automated material handling system according to claim 1, wherein the main confluence control device includes a wireless communication unit which wirelessly outputs a pass control signal for a passable state or an impassable state depending on predetermined priority to each unmanned transport device when a plurality of unmanned transport devices enter the confluence, in a state where the optical communication is disconnected in a communication break section of the optical line, and
   wherein the sub-confluence control device includes a wireless communication unit which performs wireless communication with the main confluence control device to report an entry state or a pass completion state for the confluence, controls the unmanned transport device to perform an entry operation or a standby operation depending on the pass control signal, collects state information of the main confluence control device, and then reports the collected state information to a higher-level system.

3. The apparatus for controlling line guide of an automated material handling system according to claim 2, wherein the wireless communication unit of the main confluence control device transmits a unique ID thereof to the wireless communication unit of the sub-confluence control device at the beginning of entry of the optical line, to set a wireless communication link.

4. The apparatus for controlling line guide of an automated material handling system according to claim 1, wherein the optical line comprises:
   the side light emission optical fiber;
   a reflection cover which is provided with an inner accommodation space in a shape corresponding to an outer surface of the optical fiber and fixes the optical fiber so as not to deviate from the optical line;
   a transparent body which is installed on the opposite side of the reflection cover and allows light input or output from the optical fiber to penetrate to one side thereof;
   an optical coupler which is installed at one end of one side of the optical fiber and is connected to the main confluence control device to perform optical communication with the sub-confluence control device; and
   a reflector which is installed at an end of the other side of the optical fiber so as to reflect light.

5. The apparatus for controlling line guide of an automated material handling system according to claim 4, wherein the reflection cover is formed in a side reflective mirror structure.

6. The apparatus for controlling line guide of an automated material handling system according to claim 4, wherein the optical coupler comprises:
   a fixing means which prevents a deviation of the optical fiber so as to fix the optical fiber;
   a guide means which guides a side reflection path of the optical fiber and an insertion path of the optical fiber;
   a stopper which restricts an insertion depth of the optical fiber in a predetermined length;
   an integrated board which includes a light emission unit and a light reception unit for performing optical communication with the optical fiber, a driving circuit for providing a driving pulse for driving the light emission unit, and an amplification unit for amplifying and outputting an optical signal passing through the light reception unit; and
   a side reflector which is installed at a front end of the integrated board and increases optical efficiency of the light emission unit and the light reception unit.

7. The apparatus for controlling line guide of an automated material handling system according to claim 6, wherein an inside of the stopper is processed to be a reflector.

8. The apparatus for controlling line guide of an automated material handling system according to claim 4, wherein the main confluence control device comprises:
   a power supply unit which supplies a driving power;
   a LED driving unit which outputs a driving pulse signal for driving the optical coupler;
   a reception demodulation unit which demodulates an analog signal received from the optical coupler into a digital signal;
   a state display unit which displays state information including a power state, a communication state, an error state, and a port connection state; and
   a processor which confirms the unmanned transport device entering or passing through the confluence, performs an algorithm for controlling line guide to prevent the unmanned transport devices from colliding with each other, and performing all control operations for the LED driving unit, the reception demodulation unit, the state display unit, and the power supply unit.

9. The apparatus for controlling line guide of an automated material handling system according to claim 8, wherein the main confluence control device further comprises a transceiver which is connected to a serial port including RS-232 or RS-422 and transmits and receives data.

10. The apparatus for controlling line guide of an automated material handling system according to claim 1, wherein the sub-confluence control device further comprises:
   at least one optical communication module having a light emission unit and a light reception unit for performing optical communication with the optical fiber; and
   a communication control module which performs wireless communication with the main confluence control device through the optical communication module, generates an entry report signal or a pass completion signal for the confluence, and determines the entry operation or the standby operation of the unmanned transport device depending on the pass control signal of the main confluence control device.

11. The apparatus for controlling line guide of an automated material handling system according to claim 10, wherein the communication control module comprises:
   a power input and output unit which performs input and output for power;
   a light transmission and reception unit which outputs a driving signal for driving the light emission unit and demodulates an analog signal received from the light reception unit into a digital signal;
   a state display unit which displays state information including a transmission and reception state of the signals, a power state, a communication connection state, and an error and communication state of each optical communication module; and
   a processor which generates the entry report signal or the pass completion signal, controls the entry operation of the unmanned transport device depending on the pass control signal or the standby operation after decelerating and stopping of the unmanned transport device, and performs all control operations for the light transmission and reception unit, the state display unit, and the power input and output unit.

12. The apparatus for controlling line guide of an automated material handling system according to claim 11, wherein the communication control module further comprises a transceiver which is connected to a serial port including RS-232 and transmits and receives data.

13. A method of controlling line guide for preventing unmanned transport devices from colliding with each other in an automated material handling system which transports carriers among manufacturing facilities through the unmanned transport devices, comprising:
   a step in which an optical line is formed by installing a side light emission optical fiber in a whole section of a line of a confluence of a plurality of lines of lines for moving the unmanned transport devices, and the unmanned transport device performs wireless communication through one side of the optical fiber in a whole optical line section while moving on the optical line to transmit entry state or pass completion state information to a main confluence control device;
   a step in which the main confluence control device installed at the confluence is connected to one end of the optical fiber of the optical line and performs optical communication, to confirm an entry state or a pass completion state of the unmanned transport device through the optical fiber installed on a confluence optical line;
   a step in which the main confluence control device performs, when an entry state of a new unmanned transport device is confirmed through the optical fiber of the optical line, a function of optical communication connection to a sub-confluence control device installed in the new unmanned transport device;
   a step in which the main confluence control device determines whether the new unmanned transport device enters for the confluence, and generates a pass control signal for a passable state or an impassable state to all the unmanned transport devices positioned at the confluence through the optical fiber on the basis of predetermined priority; and
   a step in which the sub-confluence control device receiving the pass control signal performs an entry operation of the unmanned transport device thereof when receiving the pass control signal for the passable state, and performs a standby operation of adjusting driving speed of the unmanned transport device thereof when receiving the pass control signal for the impassable state.

14. The method of controlling line guide of an automated material handling system according to claim 13, wherein the sub-confluence control device generates an entry report signal of reporting that the unmanned transport device enters the confluence when entering the optical line, and generates a pass completion signal of reporting that the unmanned transport device passes through the confluence when passing through the optical line.

15. The method of controlling line guide of an or an automated material handling system according to claim 13, wherein the main confluence control device continuously confirms whether a new unmanned transport device is entering the confluence through the optical communication while the unmanned transport device passes through the confluence.

16. The method of controlling line guide of an automated material handling system according to claim 13, further comprising:
   a step in which the main confluence control device transmits a unique ID thereof to perform wireless communication with a sub-confluence control device of the unmanned transport device at the beginning of entry of the optical line to perform a wireless communication connection function, when the optical communication is disconnected in the break section of the optical line;

a step in which the main confluence control device generates a pass control signal for a passable state or an impassable state of the unmanned transport device on the basis of predetermined priority in accordance with whether a new unmanned transport device enters the confluence, when the entry state of the unmanned transport device is confirmed through wireless communication; and a step in which the sub-confluence control device receiving the pass control signal performs an entry operation of the unmanned transport device thereof when receiving the pass control signal for the passable state, and performs a standby operation of adjusting speed of the unmanned transport device thereof when receiving the pass control state for the impassable state.

17. The method of controlling line guide of an automated material handling system according to claim 16, wherein, after the sub-confluence control device performs wireless communication with the main confluence control device to collect state information of the main confluence control device, the collected state information is reported to a higher-level system.

\* \* \* \* \*